(12) United States Patent
Ke et al.

(10) Patent No.: US 12,743,359 B2
(45) Date of Patent: Sep. 22, 2026

(54) ENTERPRISE RETRIEVAL-AUGMENTED GENERATION EVALUATION FRAMEWORK

(71) Applicant: SAP SE, Walldorf (DE)

(72) Inventors: Zhidong Ke, Sunnyvale, CA (US); Utsavi Benani, Fremont, CA (US); Aaron Zhang, Richmond Hill (CA); Jeffrey Hajewski, Olympia, WA (US); Nicolai Benz, Mountain View, CA (US)

(73) Assignee: SAP SE, Walldorf (DE)

( * ) Notice: Subject to any disclaimer, the term of this patent is extended or adjusted under 35 U.S.C. 154(b) by 136 days.

(21) Appl. No.: 18/922,768

(22) Filed: Oct. 22, 2024

(65) Prior Publication Data

US 2026/0111331 A1 Apr. 23, 2026

(51) Int. Cl.
*G06F 40/30* (2020.01)
*G06F 11/34* (2006.01)

(52) U.S. Cl.
CPC .......... *G06F 11/3428* (2013.01); *G06F 40/30* (2020.01)

(58) Field of Classification Search
CPC ............ G06N 3/08; G06N 20/00; G06N 3/04; G06N 3/044; G06N 3/02; G06N 5/04; G06N 20/10; G06N 20/20; G06N 5/025; G06N 5/01; G06N 5/00; G06N 7/01; G06N 3/045; G06N 5/042; G06N 5/046; G06N 5/045; G06N 5/043; G10L 15/16; G10L 15/1815; G10L 25/30; G10L 15/00; G10L 13/08; G10L 15/02; G06F 40/40; G06F 40/268; G06F 40/279; G06F 40/30; G06F 40/295; G06F 40/284; G06F 40/253; G06F 40/20
See application file for complete search history.

(56) References Cited

U.S. PATENT DOCUMENTS

2023/0259837 A1* 8/2023 Keralapura Manjunatha .............. H04L 47/215 370/235
2025/0307286 A1* 10/2025 Hurst .................. G06F 16/3338
(Continued)

OTHER PUBLICATIONS

X. Gong, R. He and Q. Peng, "Reordering of Double Pass Merging Chunking to Improve Retrieval Augmented Generation," 2024 3rd International Conference on Computer Applications Technology (CCAT), Wenzhou, China, 2024, pp. 68-78. (Year: 2024).*
(Continued)

*Primary Examiner* — Edgar X Guerra-Erazo
(74) *Attorney, Agent, or Firm* — Buckley, Maschoff & Talwalkar LLC

(57) ABSTRACT

An enterprise Retrieval-Augmented Generation ("RAG") system may be associated with at least one Large Language Model ("LLM"). A test dataset may include questions, context information, and ground truth answers. An enterprise RAG evaluation framework, coupled to the test dataset and the enterprise RAG system, iteratively perform the following process until an evaluation threshold is satisfied: determine an RAG generation metric score, determine an RAG retrieval metric score, determine an end-to-end RAG metric score, and automatically adjust at least one RAG turning parameter. When the evaluation threshold is satisfied, the framework may output a metrics report including the RAG generation metrics scores, the RAG retrieval metrics scores, and end-to-end RAG metrics scores.

21 Claims, 20 Drawing Sheets

(56) References Cited

U.S. PATENT DOCUMENTS

| | | | | |
|---|---|---|---|---|
| 2026/0073253 | A1* | 3/2026 | Zhang | G06N 5/04 |
| 2026/0079782 | A1* | 3/2026 | Bhide | G06F 11/079 |

OTHER PUBLICATIONS

W. Xiao, Y. Liu, X. Li, F. Gao and J. Gu, "TKG-RAG: A Retrieval-Augmented Generation Framework with Text-chunk Knowledge Graph," 2024 25th International Arab Conference on Information Technology (ACIT), Zarqa, Jordan, 2024, pp. 1-9 (Year: 2024).*

G. Balakrishnan and A. Purwar, "Evaluating the Efficacy of Open-Source LLMs in Enterprise-Specific RAG Systems: A Comparative Study of Performance and Scalability," 2024 IEEE 21st India Council International Conference (INDICON), Kharagpur, India, 2024, pp. 1-9. (Year: 2024).*

* cited by examiner

1800

| METRICS REPORT IDENTIFIER 1802 | ENTERPRISE RAG SYSTEM IDENTIFIER 1804 | GENERATION METRICS 1806 | RETRIEVAL METRICS 1808 | END-TO-END METRICS 1810 |
|---|---|---|---|---|
| MR_101 | E_101 | Faithfulness, Answer Relevance | Context Precision, Context Relevancy, Context Recall | Answer Semantic Similarity, Answer Correctness |
| MR_102 | E_101 | Faithfulness, Answer Relevance | Context Precision, Context Relevancy, Context Recall | Answer Semantic Similarity, Answer Correctness |
| UQ_103 | E_102 | Faithfulness, Answer Relevance | Context Precision, Context Relevancy, Context Recall | Answer Semantic Similarity, Answer Correctness |

*FIG. 18*

ENTERPRISE RETRIEVAL-AUGMENTED GENERATION EVALUATION FRAMEWORK

BACKGROUND

A Large Language Model ("LLM") may be used to achieve general-purpose language generation and other natural language processing processes. Based on language models, LLMs acquire these abilities by learning statistical relationships from substantial amounts of text (e.g., from a knowledge base) during a training process. LLMs can be used for generative Artificial Intelligence ("AI") by taking an input text or prompt and predicting future tokens or words using artificial neural networks. In some cases, an LLM may answer user queries in various contexts by cross-referencing knowledge sources. Some drawbacks of the basic LLM approach include presenting false information (or "hallucinations") and responses with out-of-date or generic information.

To address these and other issues, Retrieval-Augmented Generation ("RAG") optimizes the output of a LLM so that it references an authoritative knowledge base outside of the original training data sources. RAG can extend LLM capabilities to specific domains or an organization's internal knowledge base without retraining the model. For example, FIG. 1 is a high-level system 100 RAG architecture that includes a LLM 110, a vector search 120, and a vector data store 130. FIG. 2 is a basic RAG method that begins with receiving a user query at S210. In response to the user query, the LLM 110 interprets the query using embedding at S220. A vector search 120 is performed using information in the vector data store 130 at S230. The vector data store 130 might be populated with, for example, with information gathered from a knowledge base of enterprise documents (e.g., emails, memos, reports, etc.). The vector search 120 returns relevant context information specific to that enterprise which is used by the LLM 110 to generate an appropriate response to the user query at S240. In this way, RAG redirects the LLM 110 to retrieve relevant context information from authoritative, pre-determined knowledge sources giving an organization control over the text output that is generated. In this way, RAG may provide a cost-effective AI implementation (because the LLM 110 doesn't need to be retrained with the new data), and more current information can be included without retraining.

RAG has been very successful at presenting accurate information. However, it can be difficult, time consuming, and costly to efficiently generate correct answers-especially when there is a substantial amount of enterprise information and/or a large number of data sources to be searched. As a result, various parameters of a RAG system may be adjusted to tuned looking to improve answers. For example, the adjustments might seek to improve the cleanliness of data from the data sources provided as context to the LLM for answers. Similarly, the embedding model and the chunking algorithm might be adjusted, the retrieval system (including the vector database) might be fine-tuned, the LLM model and prompt generator might be changed, etc. When changes are made it is important to decide if those changes actually improve RAG performance.

It would therefore be desirable to provide a framework to evaluate an enterprise RAG system in a secure, automatic, and efficient manner.

SUMMARY

According to some embodiments, methods and systems may include an enterprise RAG system associated with at least one LLM. A test dataset may include questions, context information, and ground truth answers. An enterprise RAG evaluation framework, coupled to the test dataset and the enterprise RAG system, iteratively perform the following process until an evaluation threshold is satisfied: determine an RAG generation metric score, determine an RAG retrieval metric score, determine an end-to-end RAG metric score, and automatically adjust at least one RAG turning parameter. When the evaluation threshold is satisfied, the framework may output a metrics report including the RAG generation metrics scores, the RAG retrieval metrics scores, and end-to-end RAG metrics scores.

Some embodiments comprise: means for iteratively performing, by a computer processor of RAG evaluation system coupled to an enterprise RAG system associated with at least one LLM, the following process until an evaluation threshold is satisfied: determining an RAG generation metric score, determining an RAG retrieval metric score, determining an end-to-end RAG metric score, and automatically adjusting at least one RAG turning parameter; and when the evaluation threshold is satisfied, means for outputting a metrics report that includes the RAG generation metrics scores, the RAG retrieval metrics scores, and end-to-end RAG metrics scores.

Some technical advantages of some embodiments disclosed herein are improved systems and methods to provide a framework to evaluate an enterprise RAG system in a secure, automatic, and efficient manner.

BRIEF DESCRIPTION OF THE DRAWINGS

FIG. 18 is a portion of a metrics report database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
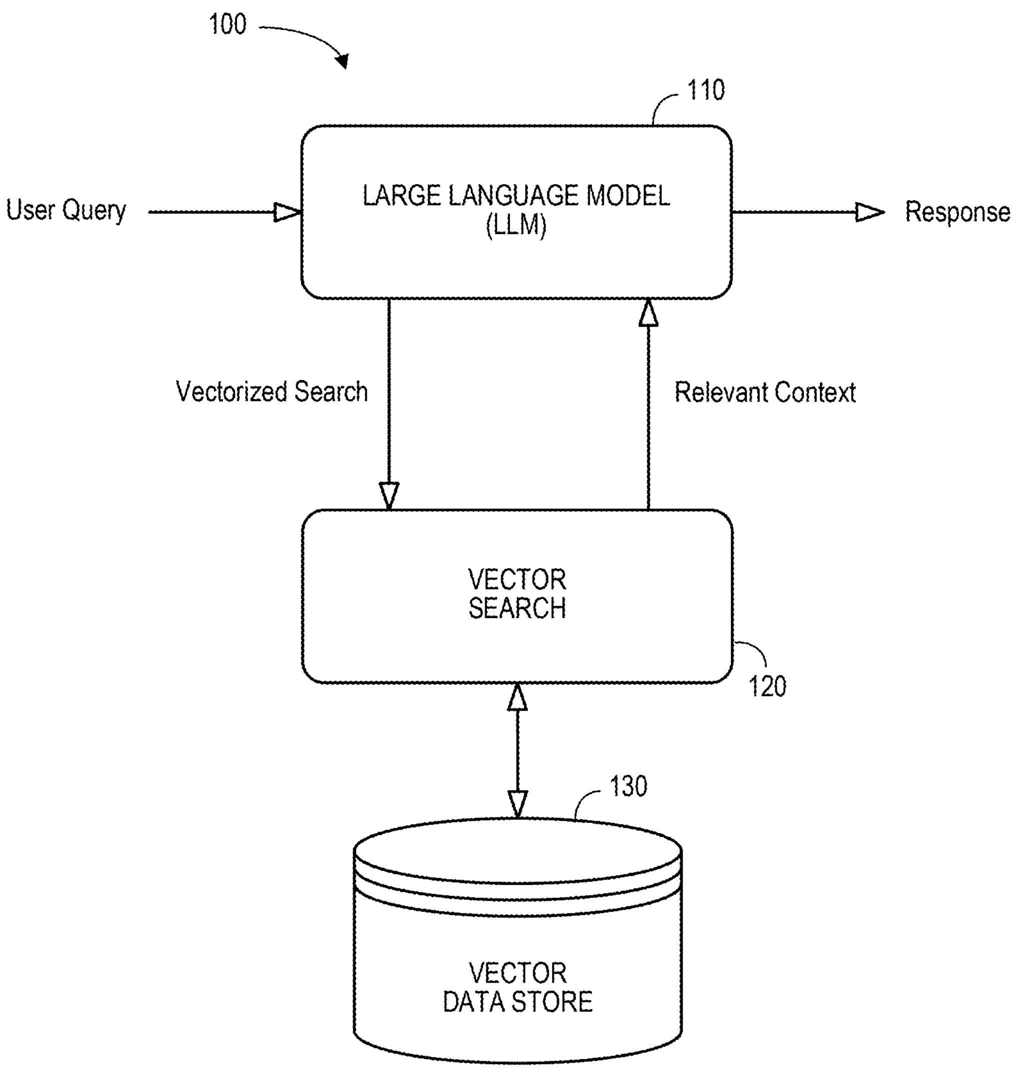
FIG. 1 is a high-level system RAG architecture.
Figure 2:
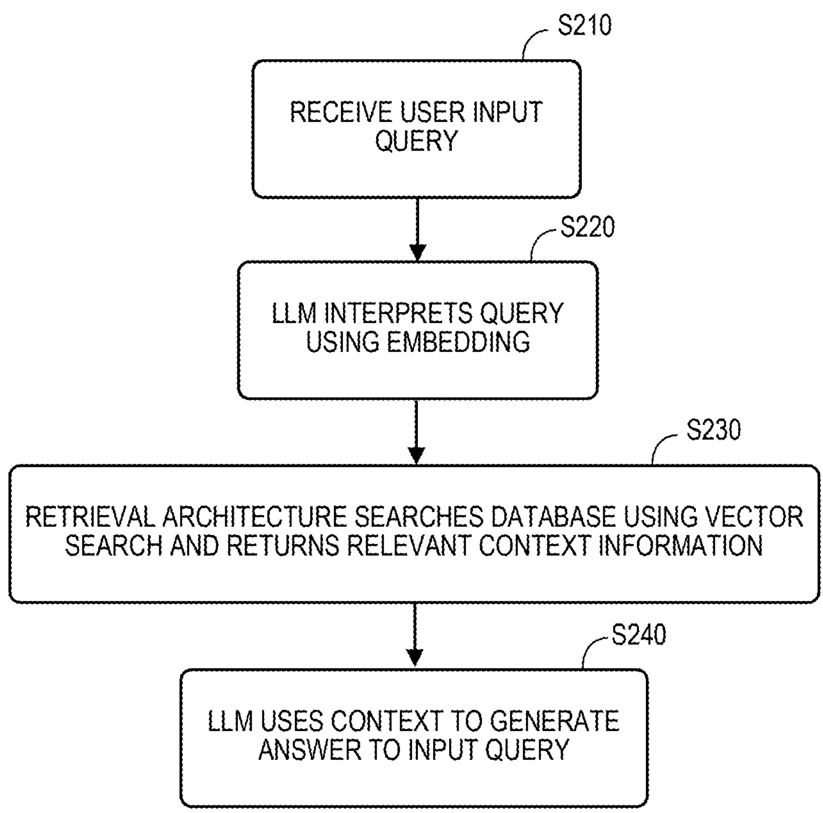
FIG. 2 is a basic RAG method.
Figure 3:
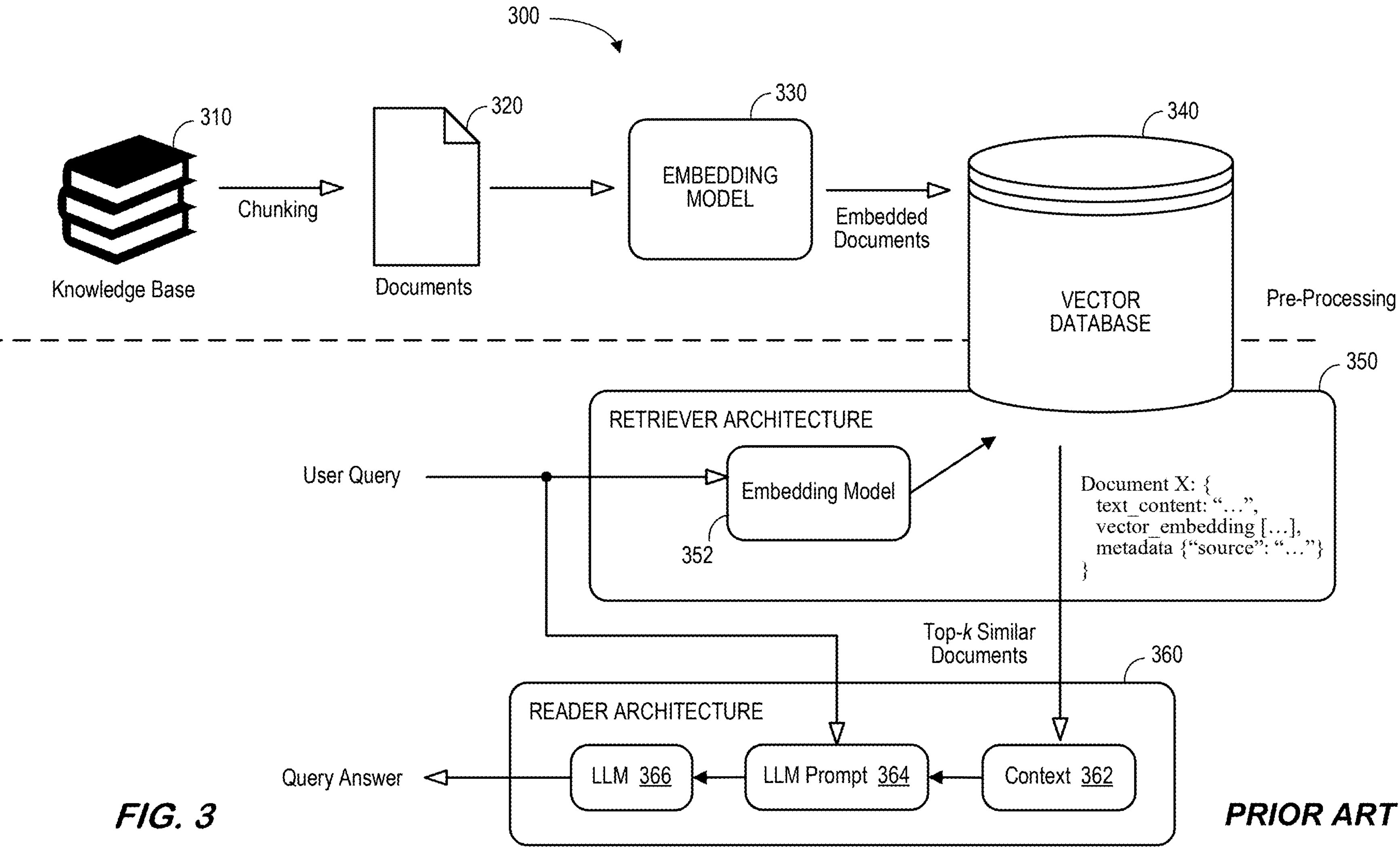
FIG. 3 is a more detailed system RAG architecture.

Given a user question, RAG attempts to find the most relevant snippets from a knowledge base to answer that question. FIG. 3 is a more detailed system 300 RAG architecture. In pre-processing, documents 320 from a knowledge base 310 are provided to an embedding model 330. This process may involve "chunking" the information. Note that the system 300 may be associated with a substantial volume of unstructured data (e.g., a corpus with many documents, a library of millions of pictures, thousands of hours of video, etc.). Chunking divides data up into chunks prior to storage, so that each one can be inspected for relevance to an input query during a search. The system 300 may include some overlap in these chunks, to avoid information being split between chunk boundaries (and thus lost). The size and format of these chunks can vary from application to application.

To provide answers in a useful timeframe, RAG needs to rapidly search a database of information on which it was not trained and return relevant pieces of context information. The system 300 may first map data to a numerical vector via "vector embedding." As used herein, the phrase "vector embedding" may refer to the process of representing an arbitrary piece of unstructured data as an n-dimensional array of numbers. The numbers are not inherently meaningful or interpretable, but they provide a way of comparing two pieces of unstructured data by mapping them to a point in n-dimensional space. Similar pieces of data will sit close to one another in the vector space, and dissimilar pieces of data will be further away.

The embedding model 330 can then store information about embedded documents in a vector database 340. The vector database 340 might include, for each document, text content, vector values, metadata (e.g., a document title, enterprise identifier, date, and a source of the information), etc. As used herein, the phrase "vector database" may refer to a data store that is designed and optimized to handle vector data (as opposed to a tabular data stored by traditional relational databases). They provide efficient storage, indexing, and querying mechanisms (optimized for high-dimensional and variable-length vectors) and allow for flexible data storage and retrieval.

The retriever architecture 350 acts as an internal search engine-given a user query, it returns relevant snippets that originated in the knowledge base 310. The snippets are then fed to a reader architecture 360 to help it generate a response. Initially, the retriever architecture 350 receives a user query or question. The retriever architecture 350 includes an embedding model 352 that processes the user query. The embedded user query can then be used to access information from the vector database 340. In particular, the system 300 locates the top-k closest documents to the embedded user query based on semantic similarity. That is, the system wants to find the k documents that have the closest meaning by picking the k closest vectors. There are many ways of measuring the distance between vectors, such as Euclidean distance, Cosine distance, a dot product projection, Manhattan distance, any other state-of-the-art similarity search technique, etc.

This information is provided as context 362 in the reader architecture 360 which processes and aggregates document contents for use in an LLM prompt 364. Such a process may involve prompt compression and/or reranking techniques. As used herein, the term "reranking" may refer to retrieving more documents than needed and then reranking the results before selecting the top k. The LLM prompt 364 is then created based on the original user query and the additional relevant context 362. Finally, an LLM 366 converts the LLM prompt 364 into an RAG query answer or response.

Figure 4:
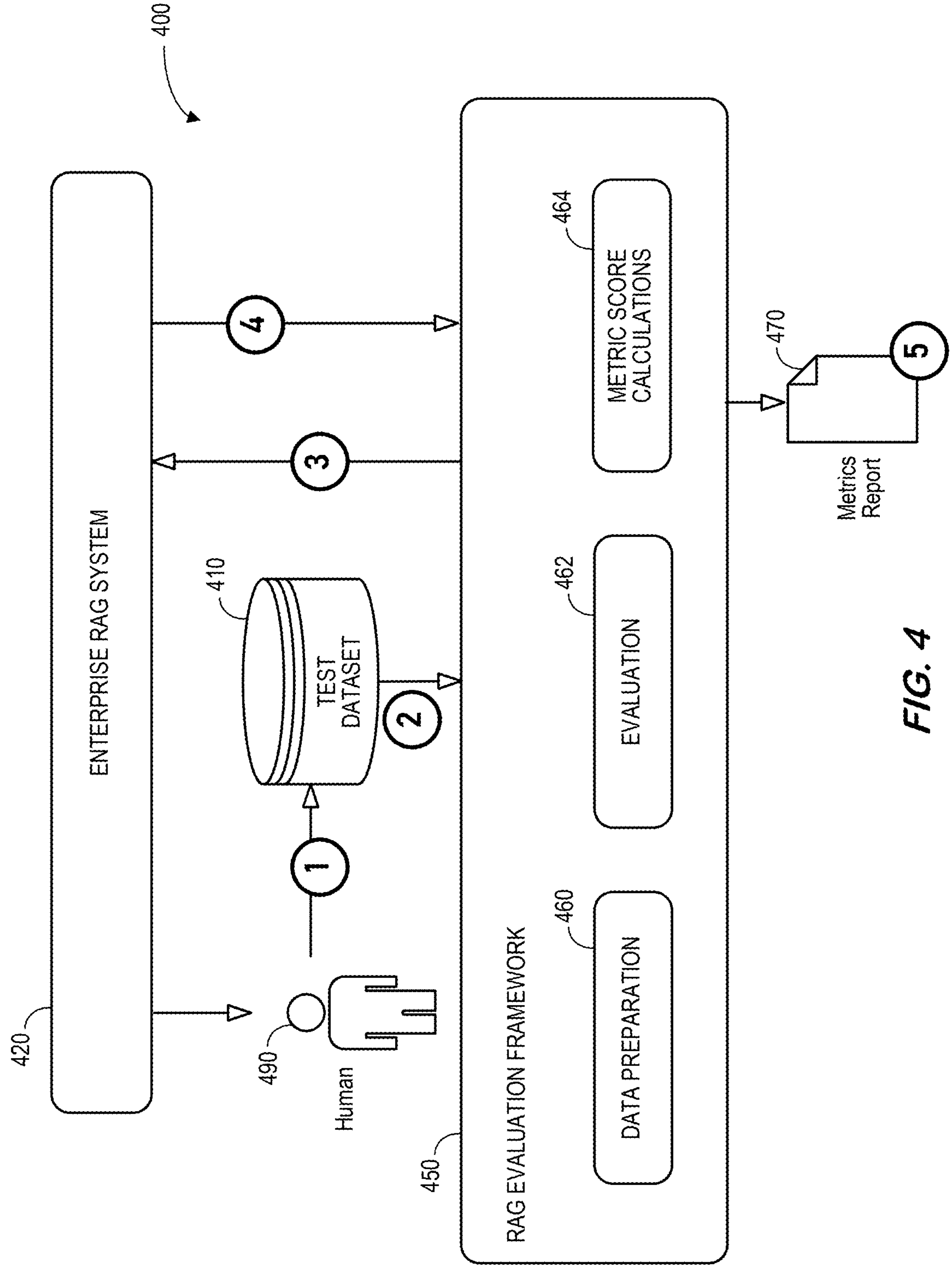
FIG. 4 is a high-level system architecture in accordance with some embodiments.

While the system 300 may help optimize an output of a LLM by referencing an authoritative knowledge base outside of the training data sources before generating a response, it would be helpful it could also efficiently and accurately provide a framework to evaluate the system 300 in a secure, automatic, and efficient manner. FIG. 4 is a high-level block diagram of one example of a system 400 architecture according to some embodiments. In particular, at (1) a human 490 may review enterprise documents associated with an enterprise RAG system 420 and write question ground truths (e.g., information that is known to be real or true) that are stored in a test dataset 410. The test dataset 410 may include, for example, questions, context, and answers. At (2), a RAG evaluation framework 450 may access information in the test dataset 410. The RAG evaluation framework 450 may also send questions to the enterprise RAG system 420 at (3) and receive answers in return at (4). The RAG evaluation framework 450 may include data preparation 460, evaluation 462, and/or metrics score calculations 464 elements that are used to generate a metrics report 470 that accurately evaluates the enterprise RAG system 420 at (5).

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The RAG evaluation framework 450 may store information into and/or retrieve information from various data stores (e.g., the test dataset 410 and a metrics report database), which may be locally stored or reside remote from the RAG evaluation framework 450. Although a single RAG evaluation framework 450 is shown in FIG. 4, any number of such devices may be included. Moreover, various devices described herein might be combined according to embodiments of the present invention. For example, in some embodiments, the test dataset 410 and the RAG evaluation framework 450 might comprise a single apparatus. The system 400 functions may be performed by a constellation of networked apparatuses, such as in a distributed processing or cloud-based architecture. In some cases, the RAG evaluation framework 450 may process information associated with a number of different enterprises.

The system 400 may be accessed via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify how the elements connect with an enterprise computing environment infrastructure) and/or provide or receive automatically generated recommendations, alerts, summaries, or results associated with the system 400.

Figure 5:
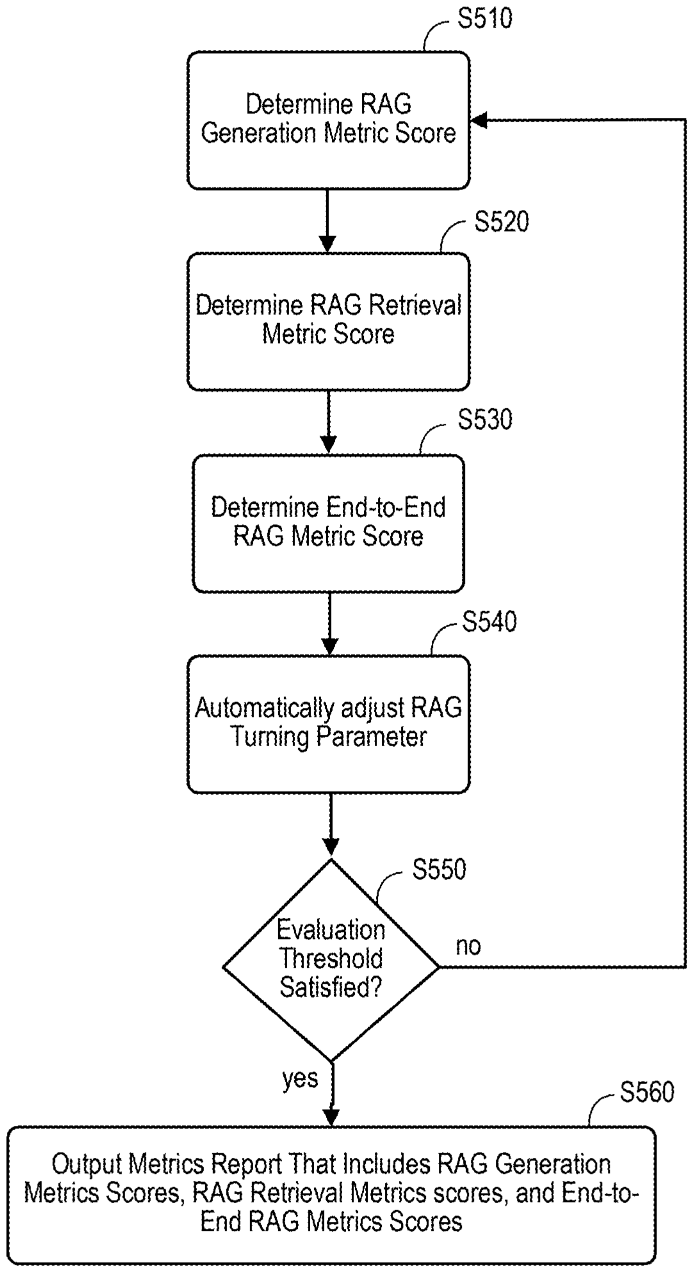
FIG. 5 is an enterprise RAG evaluation method according to some embodiments.

FIG. 5 is a method that might be performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Initially, a number of steps may be iteratively performed unit an evaluation threshold is satisfied. In particular, at S510 one or more RAG generation metric scores are determined. In addition, one or more RAG retrieval metric scores and RAG end-to-end metric scores are determined at S520 and S530. According to some embodiments, RAG turning parameters may then be automatically adjusted at S540 (looking to improve RAG performance). The RAG tuning parameter might be associated with, for example, a document loader parameter, a splitter parameter, a threshold value, an embedding model, a chunk size, a chunk overlap parameter, etc.

When the evaluation threshold is satisfied at S550, the system outputs a metrics report that includes the RAG generation metrics scores, the RAG retrieval metrics scores, and end-to-end RAG metrics scores at S560. The evaluation threshold might be associated with a number of iterations (e.g., steps S510 through S540 should be repeated 20 times). In some embodiments, the evaluation threshold is associated with a level of enterprise RAG performance. According to some embodiments, an enterprise RAG evaluation framework may also clean up noise in a test dataset and/or add more signals to the test dataset. Moreover, the enterprise RAG system might be part of (or otherwise associated with) an Artificial Intelligence ("AI") toolkit. An AI toolkit may be designed to empower sales, service, and e-commerce teams with proactive and contextual generative AI and might use the power of AI to enhance productivity and decision-making processes within an enterprise. For example, the SAP™ Customer Experience ("CX") AI Toolkit® helps an enterprise automate time-consuming tasks and to seamlessly analyze data from across an enterprise with personalized, role-specific AI features. Features of an AI toolkit may, for example: generate document summaries for specified use cases; help write emails, blog articles, and social media posts; provide precise answers to work-related questions using a company's content (e.g., past emails, conversations, files, etc.); assist with scheduling and calendar management; etc.

Figure 6:
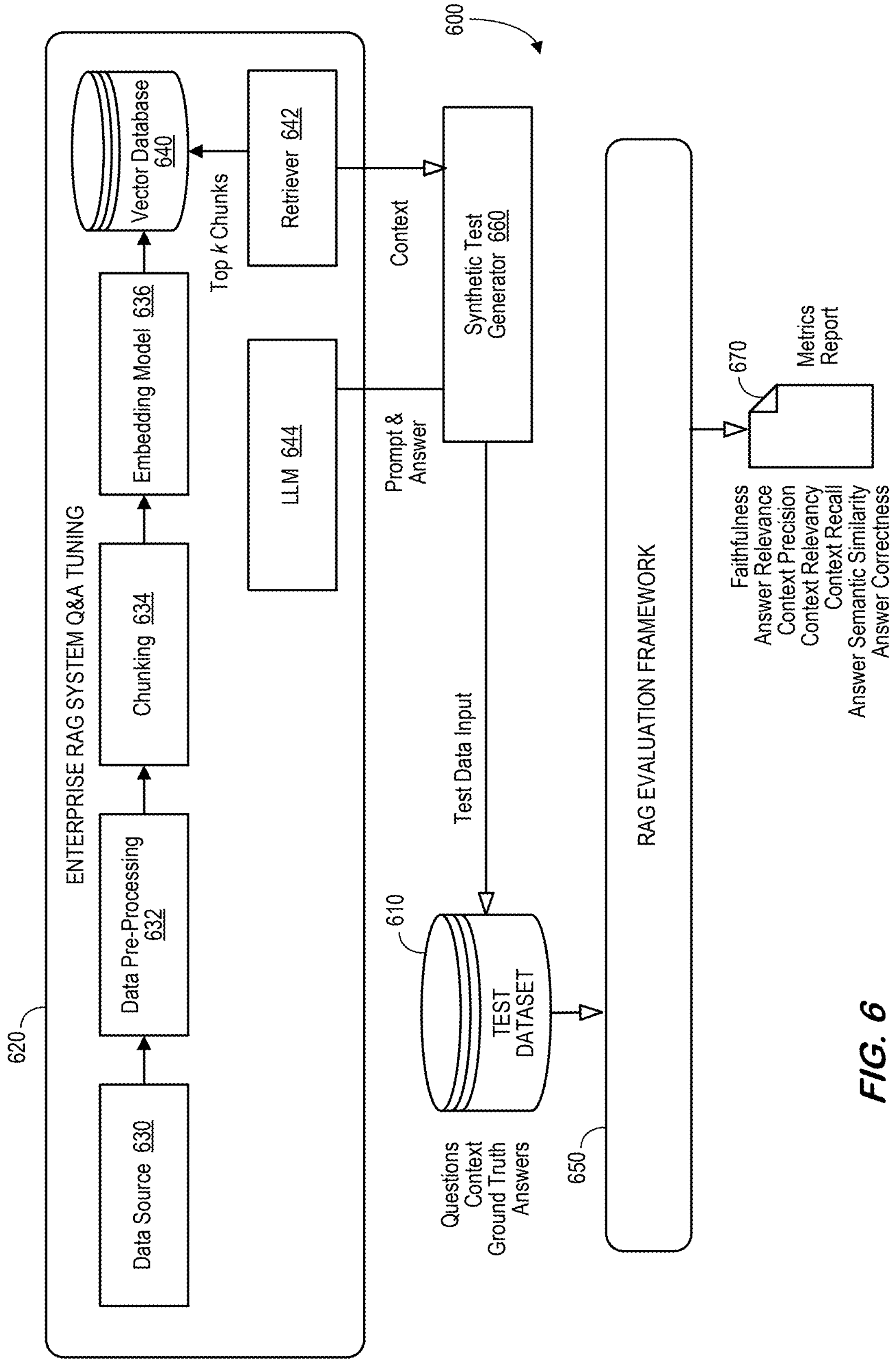
FIG. 6 is a more detailed enterprise RAG evaluation system in accordance with some embodiments.

FIG. 6 is a more detailed enterprise RAG evaluation system 600 in accordance with some embodiments. In this case, information stored in a test dataset 610 represents synthetically generated information (instead of information generated by a human) created by a synthetic test generator 660. The test dataset 610 may include, for example, questions, context, and answers. A RAG evaluation system 650 may access information in the test dataset 610, send questions to an enterprise RAG system 620, and receive answers in return. Various elements of the enterprise RAG system 620 that might be adjusted or tuned seeking to improve performance include: a data source 630, data pre-processing 632, chunking 634, an embedding model 636, a vector database 640, a retriever 642, and an LLM 644. As before, the RAG evaluation system 650 may then generate a metrics report 670 that accurately evaluates the enterprise RAG system 620.

Figure 7:
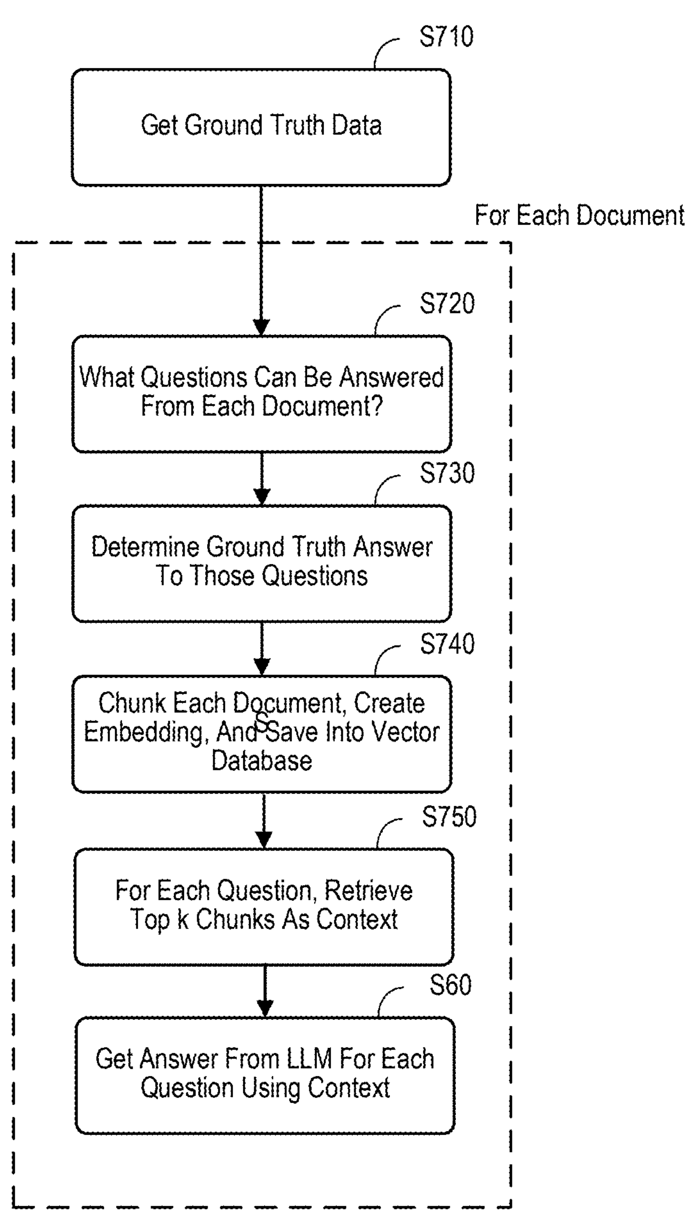
FIG. 7 is a data preparation method according to some embodiments.

FIG. 7 is a data preparation method according to some embodiments. Initially, the system obtains ground truth data to prepare an evaluation at S710. To achieve quality results, embodiments may utilize real world data. For example, in enterprise sales use cases, between fifty and one hundred sales related documents (e.g., emails) may be used with twenty to fifty questions with ground truth answers. Similarly, for service use cases, between fifty and one hundred cases may be used with twenty to fifty questions with ground truth answers. In commerce sales use cases, between fifty and one hundred product manuals may be used with twenty to fifty questions with ground truth answers. If sufficient human generated questions cannot be obtained, embodiment may instead use an LLM to generate synthetic test data (e.g., using Ragas test data generator).

For each document, five parts may be prepared for evaluation. First, it is determined what questions could be answered from this document at S720. Second, ground truth answers for each question are determined at S730. Third, the system may chunk each document into small portions, create embeddings, and save the embedding into a vector database at S740. Fourth, for each question, the system may retrieve the top-k chunks from the vector database as context at S750. Fifth, the system may get answers from LLM for each question using that context at S760.

Figure 8:
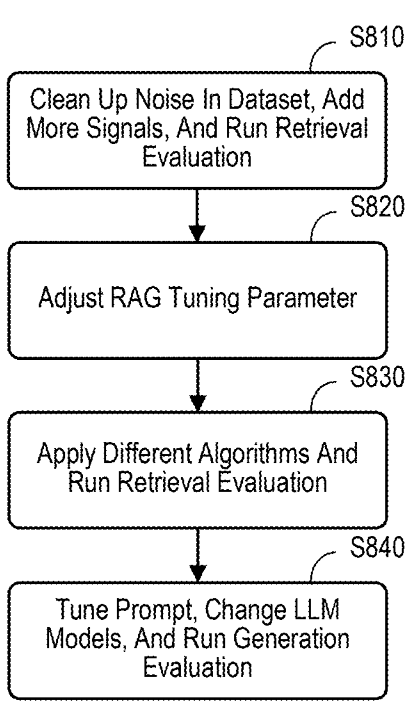
FIG. 8 is an evaluation method in accordance with some embodiments.

FIG. 8 is an evaluation method in accordance with some embodiments. At S810, the system may clean up noise in the data set (e.g., by removing email footers), add some more signals as appropriate (e.g., adding the owner and/or sender of documents), and execute the retrieval evaluation. At S820, various RAG tuning parameters may be adjusted (e.g., associated with document loader, splitter, threshold, embedding models and chunk size, overlaps, etc.). At S830, the system may apply different algorithms for retrieval and execute the retrieval evaluation. At S840, the system may tune the prompt, change the LLM models, and run the generation evaluation. After the performance of each component is satisfied, an end-to-end evaluation may be executed.

Figure 9:
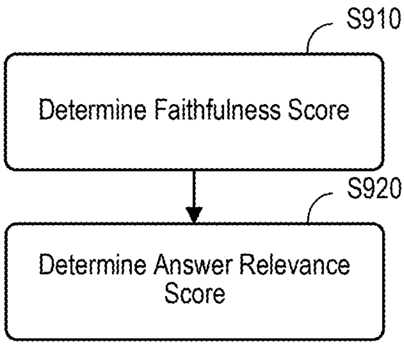
FIG. 9 is a generation metrics determination method according to some embodiments.

RAG generation metrics may be calculated as follows. In particular, FIG. 9 is a generation metrics determination method according to some embodiments. At S910, a "faithfulness score" is determined measuring how factually consistent the generated answer is with the context information. This score may be calculated using the answer and context on a 0 to 1 scale (where higher is better):

$$F = \frac{\text{Number\_Good\_Statements}}{\text{Number\_Total\_Statements\_From\_Generated\_Answers}}$$

Note that "good statements" may refer to statements that can be accurately inferred from the given context.

At S920, an "answer relevance score" is determined measuring how correctly the generated answer addresses the question. The concept is that if the answer correctly addresses the question, it is highly likely that the original question can be reconstructed using only the answer. Initially, the system generates questions i (1 through N) and then determines the average similarity to the original answer $E_O$:

$$\text{Answer\_Relevancy} = \frac{1}{N}\sum_{i=1}^{N}\cos(E_{g_i}, E_o)$$

$$\text{Answer\_Relevancy} = \frac{1}{N}\sum_{i=1}^{N}\frac{E_{g_i} \cdot E_o}{\|E_{g_i}\|\|E_o\|}$$

Figure 10:
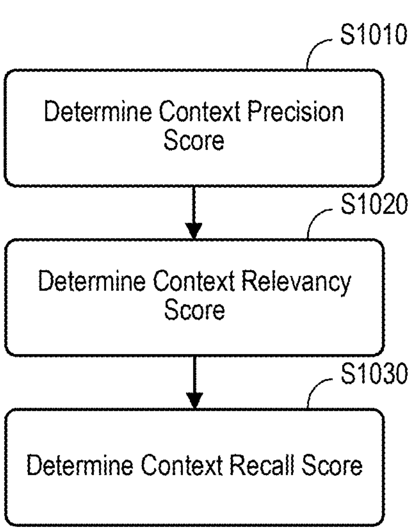
FIG. 10 is a retrieval metrics determination method according to some embodiments.

RAG retrieval metrics may be calculated as follows. In particular, FIG. 10 is a retrieval metrics determination method according to some embodiments. At 1010, a "context precision" score is determined measuring if all relevant items from the context information are ranked high and retrieved. It is computed using the question, the ground truth, and the contexts (with values from 0 to 1 and higher scores indicate greater precision). Initially, for K chunks:

$$\text{Precision} = \frac{\text{True\_Positive}}{(\text{True} + \text{False})\text{\_Positive}}$$

The context precision can then be calculated using:

$$\text{Context\_Precision} = \frac{\sum \text{Precision @} k}{\text{Total\_Relevant\_Items\_k\_Chunks}}$$

At 1020, a "context relevancy" score is determined measuring a relevancy of the retrieved context information to the question (with values ranging from 0 to 1 and higher values signify better relevancy). According to some embodiments, the context only includes information essential to the query:

$$\text{Context\_Relevancy} = \frac{|S|}{|\text{Total\_Number\_of\_Sentences\_in\_Retrieved\_Context}|}$$

Where S represents a sentence.

At 1030, a "context recall" score is determined measuring how well the retrieved context information matches the generated answer (e.g., an annotated answer considered as the ground truth). It may be calculated using the ground truth and retrieved context (with scores ranging from 0 to 1 and higher scores denote better alignment. Ideally, every sentence in the ground truth answer should correspond to the retrieved context.

$$\text{Context\_Recall} = \frac{|\text{GT\_Sentences\_That\_Can\_Be\_Attributed\_to\_Context}|}{|\text{Number\_of\_Sentences\_in\_GT}|}$$

Figure 11:
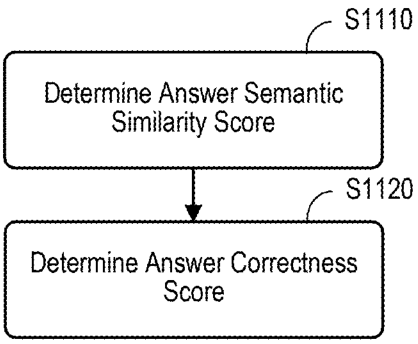
FIG. 11 is an end-to-end metrics determination method in accordance with some embodiments.

End-to-end RAG generation metrics may be calculated as follows. In particular, FIG. 11 is an end-to-end metrics determination method in accordance with some embodiments. At 1110, an "answer semantic similarity" score is determined measuring how closely semantic content of the generated answer aligns with the associated ground truth. Scores range from 0 to 1 (with higher scores indicating better alignment). The evaluation may use a cross-encoder model to determine the semantic similarity score, providing insights into the quality of the response, and use the same embedding model to calculate the similarity At S1120, an "answer correctness" score is determined measuring a factual overlap between the generated answer and the ground truth answer. Here:

TP (True Positive) are facts or statements that are present in both the ground truth and the generated answer, FP (False Positive) are facts or statements that are present in the generated answer but not in the ground truth, and FN (False Negative) are facts or statements that are present in the ground truth but not in the generated answer.

$$FC = \frac{|TP|}{(|TP| + 0.5 \times (|FP| + |FN|))}$$

Figure 12:
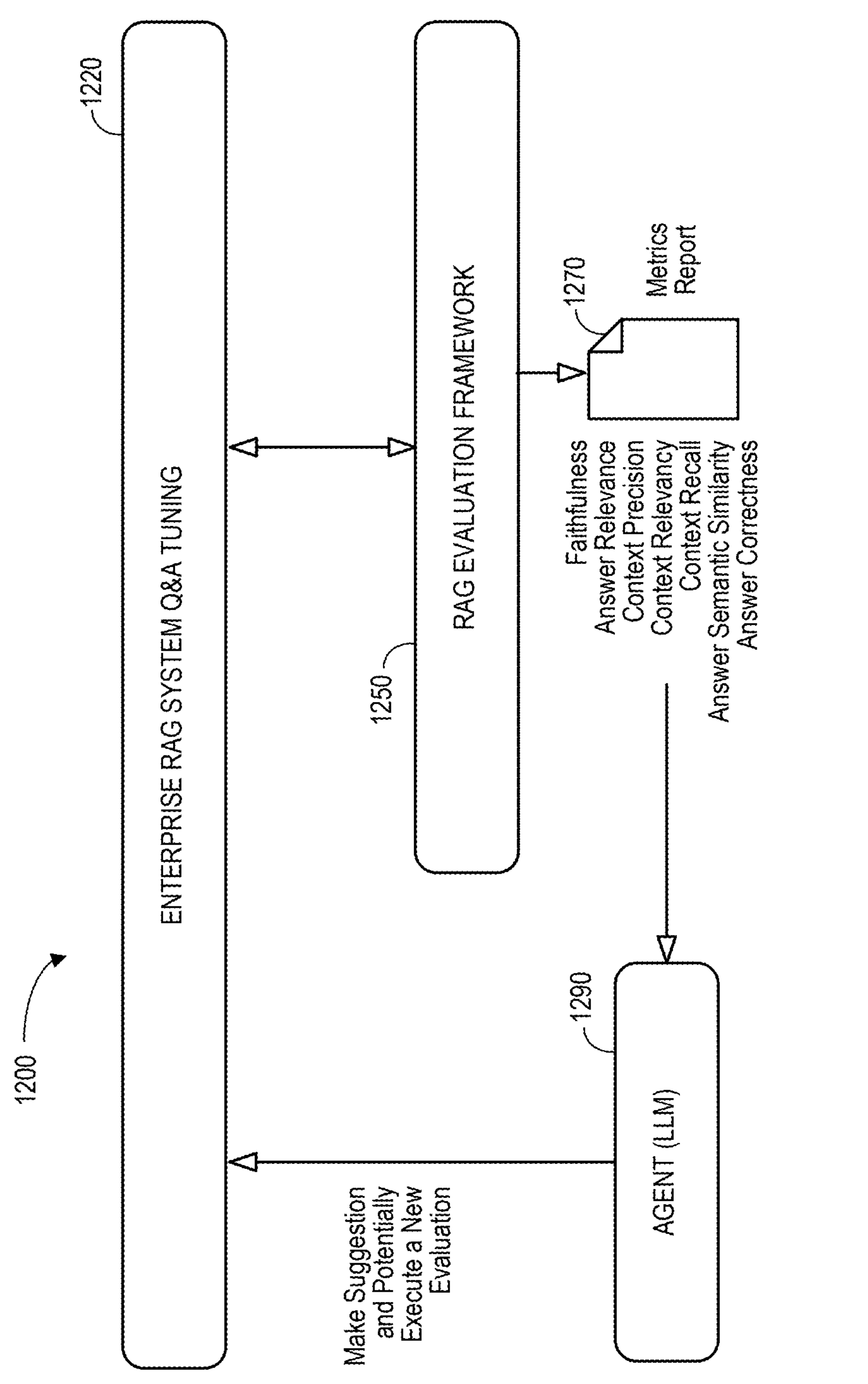
FIG. 12 is a system including an automated agent according to some embodiments.

FIG. 12 is a system 1200 including an automated agent according to some embodiments. As before, an RAG evaluation framework 1250 interacts with an enterprise RAG system 1220 having Q&A tuning to automatically generate a metrics report 1270. The metrics report 1270 might include, for example, faithfulness, answer relevance, context precision, context relevancy, context recall, answer semantic similarity, answer correctness, etc. According to some embodiments, the metrics report is provided to an automated agent 1290 (which may be implemented using an LLM). The agent 1290 can then make suggestions for the enterprise RAG system 1220 and potentially execute a new evaluation using those suggestions.

Figure 13:
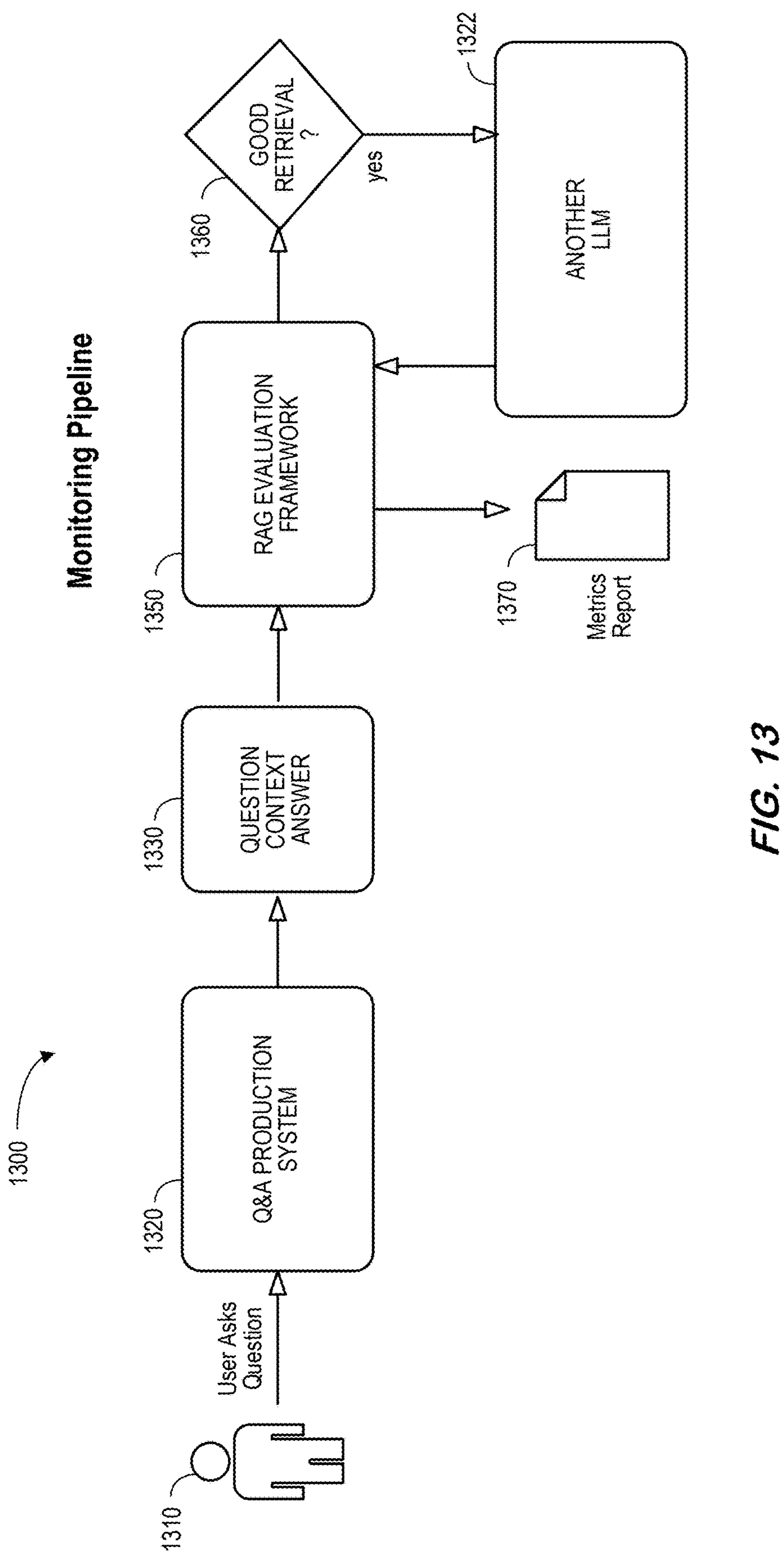
FIG. 13 is a monitoring pipeline in accordance with some embodiments.

According to some embodiments, an RAG evaluation framework is associated with a monitoring pipeline for a production enterprise RAG system and at least one alternate LLM. For example, FIG. 13 is a monitoring pipeline 1300 in accordance with some embodiments. A user 1310 may provide a question to a Q&A production system 1320. The question, a context, and an answer are then provided to an RAG evaluation framework 1350. If it is determined that a good retrieval has been performed at 1360, the question is also provided to another (better) LLM 1322. A metrics report 1370 can then compare performance.

Figure 14:
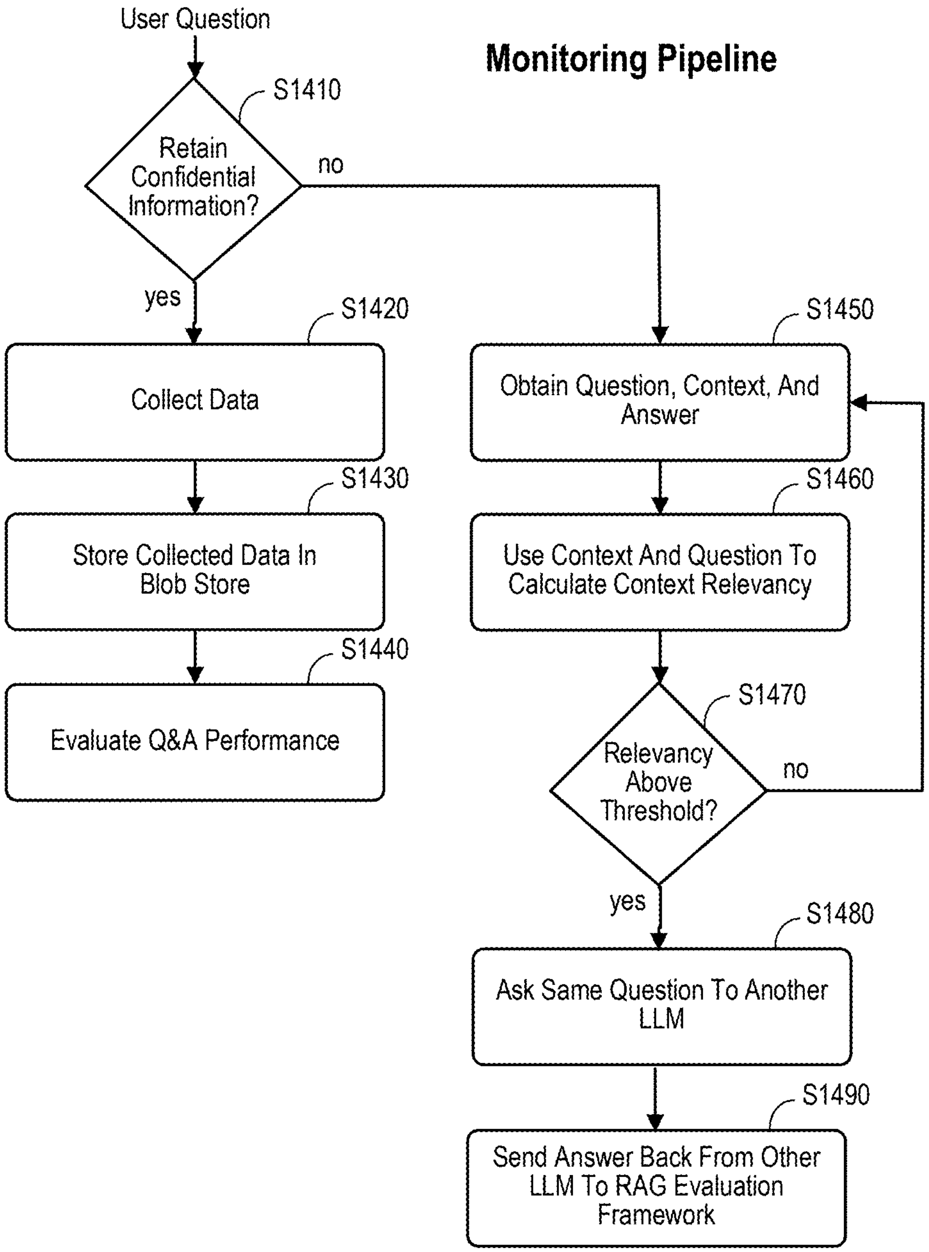
FIG. 14 is a monitoring pipeline method in accordance with some embodiments.

FIG. 14 is a monitoring pipeline method in accordance with some embodiments. If confidential information about a user question is allowed to be retained at S1410, the system may collect relevant data at S1420 (e.g., the query, retrieval context with scores, the final prompt, an obfuscated prompt, a response from an LLM, a latency for each component, etc.). The collected information may then be placed in object storage (e.g., a blob store) at S1420. The stored data can then be used by the system to evaluate Q&A performance at S1430. Note that such stored information could also be helpful for other reasons such as when debugging a system or assisting with customer support.

If confidential information about a user question is not allowed to be retained at S1410, the question, context, and answer are collected for evaluation at S1450 when the user asks a question. The context and question are used at S1460 to calculate context relevancy (e.g., as described in connection with FIG. 10). If the context relevancy is not above a threshold at S1470, nothing further is done for that user question. If the context relevancy is above a threshold at S1470 (e.g., it is a "good retrieval") the same question to another, better LLM to get the "ground truth" answer S1480. This information can be provided to an RAG evaluation framework at S1490 to generate all metrics of interest. Note that this approach may be an expensive evaluation, thus in some embodiments it is only enabled for certain organizations or users.

Embodiments may be implemented for various types of enterprise RAG systems. For example, an enterprise RAG system may implement context retrieval optimization in which the system retrieves a document and an associated document identifier from an enterprise data source. The retrieved document is divided into a first set of chunks and a first LLM query is designed to predict questions associated with the retrieved document based on the first set of chunks and output to a first LLM. A first embedding model is executed on a response to the first LLM query along with document metadata, and a result of the first embedding model is stored in an RAG vector database.

The retrieved document is also divided into a second set of chunks smaller than chunks in the first set of chunks (and include a second chunk identifier). A second embedding model is executed based on the second set of chunks (including the second chunk identifier), and a result of the second embedding model is stored in the RAG vector database. A query server in an AI toolkit can then receive a user query from the enterprise and retrieve the top-k documents based on information in the RAG database. The AI toolkit also retrieves, for each top-k document, the top-n chunks from the second set of chunks and outputs a second LLM query, based on the top-n chunks, to a second LLM (e.g., more powerful and/or expensive as compared to the first LLM). The AI toolkit can then receive a second response to the second LLM query and transmit the second response to the user. In this way, embodiments may address the challenge of efficiently and accurately retrieving relevant enterprise documents in the context of RAG systems.

Figure 15:
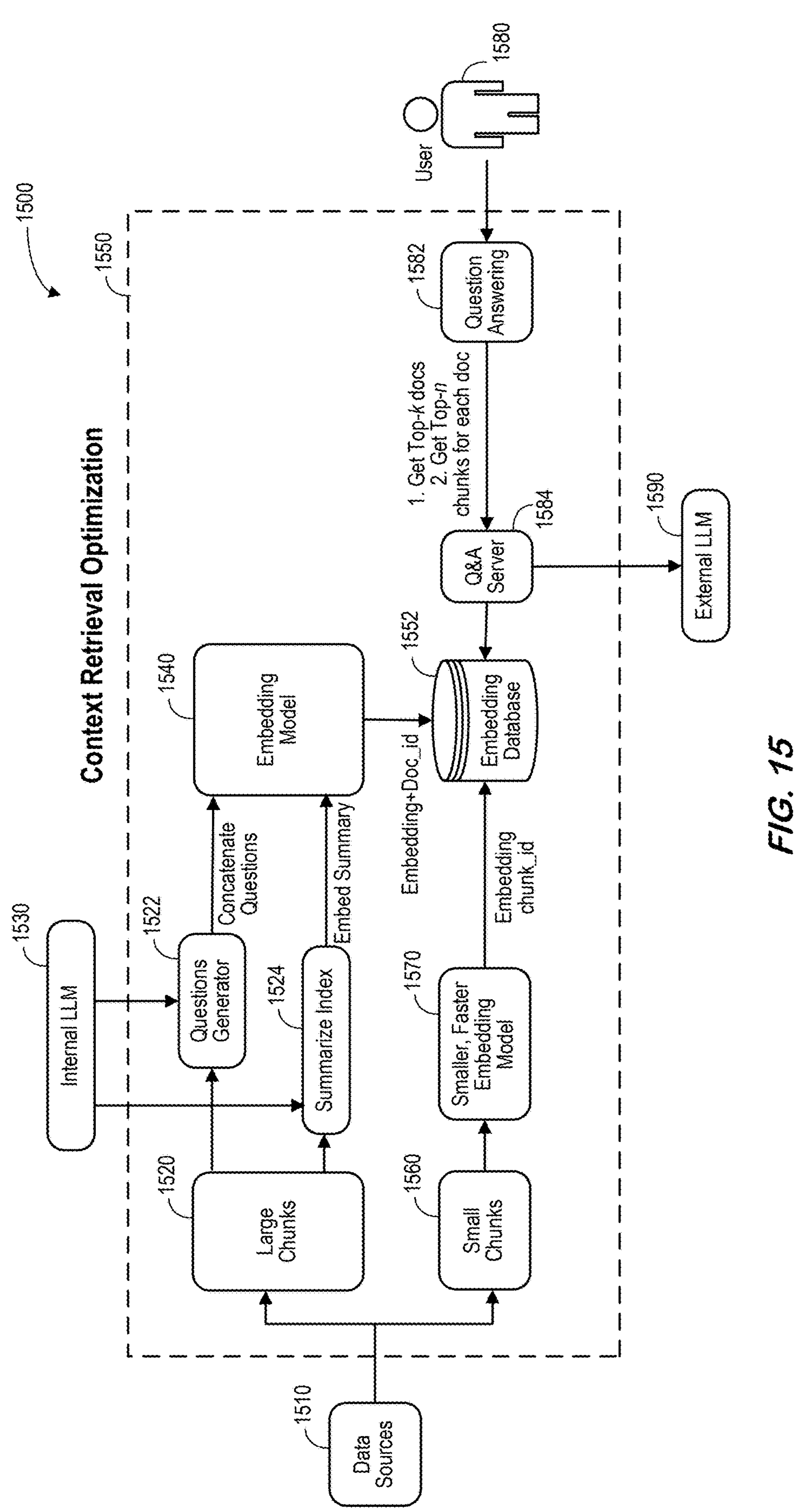
FIG. 15 is a context retrieval optimization system according to some embodiments.

For example, FIG. 15 is one such a context retrieval optimization system 1500 in accordance with some embodiments. Initially, documents (including document identifiers) from data sources 1510 are divided into relatively large chunks 1520 by an AI toolkit 1550. A questions generator 1522 uses the large chunks and an internal LLM 1530 to predict a number of potential questions (e.g., five potential questions) that might be asked about the documents. For example, a document that contains a presentation about a sales strategy of an enterprise might be used to answer a question such as "what is our sales strategy for Europe over the next five years?" The internal LLM 1530 may also be used to create a summarize index 1524 about the documents. A concatenated string of the predicted questions may then be provided to an embedding model 1540 along with the summarize index 1524. The embedding model 1540 then uses that information update an embedding database 1552 to store the embedding about the document and document identifier.

In addition, the documents from the data sources 1510 are divided into relatively smaller chunks 1560 (e.g., smaller than the relatively large chunks 1520). The smaller chunks 1560 are processed using a smaller, faster embedding model 1570 (e.g., smaller and faster as compared to the internal LLM 1530). That result is then used to update the embedding database 1552 to store the embedding and chunk identifier. Once the embedding database 1552 is updated with the information from the data sources 1510, a user 1580 may provide a query about those documents to a question answering service 1582 and a Q&A server 1584. The Q&A server 1584 retrieves the appropriate context from the embedding database 1550. The context might comprise, for example, the top-k documents and (for each top-k document) the top-n chunks. The question from the user 1580 and the context is then used to create an appropriate prompt for an external LLM 1590 (e.g., external to the AI toolkit 1550).

Figure 16:
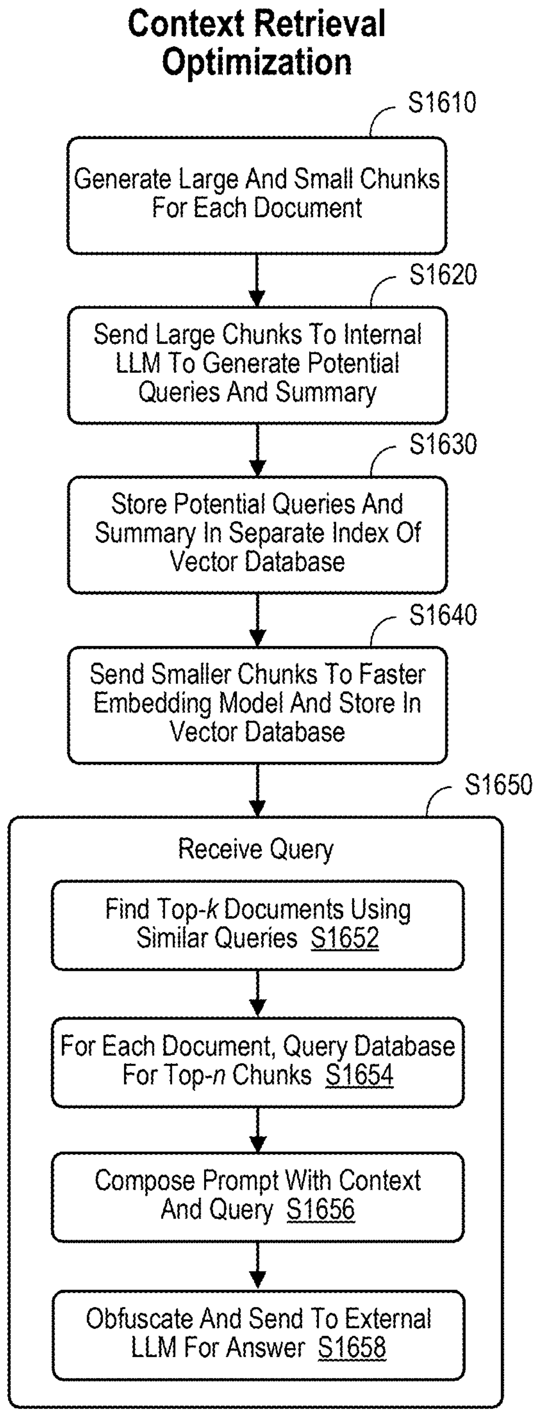
FIG. 16 is an optimization method in accordance with some embodiments.

FIG. 16 is a context retrieval optimization method according to some embodiments. At S1610, when an RAG system gets data from a user it generates large chunks and small chunks for each document. At S1620, the system sends the large chunks of the document to a first LLM to generate predicted questions and summaries. At S1630, the questions and summary are stored by a first embedding model in a separate index of a vector database. At S1640, the system sends smaller chunks of the document to a second embedding model (smaller but faster than the first embedding model) to generate an embedding vector which is stored in the vector database.

At S1650, a query is received at a Q&A server from a user. In particular, the Q&A server finds the top-k documents by finding the most similar questions and summary that matches the user's query at S1652. At S1654, for each document, the system queries the database for the top-n chunks. At S1656, a prompt is composed with the appropriate context and query. At S1658, the system obfuscates the prompt and sends it to an LLM for answering.

Figure 17:
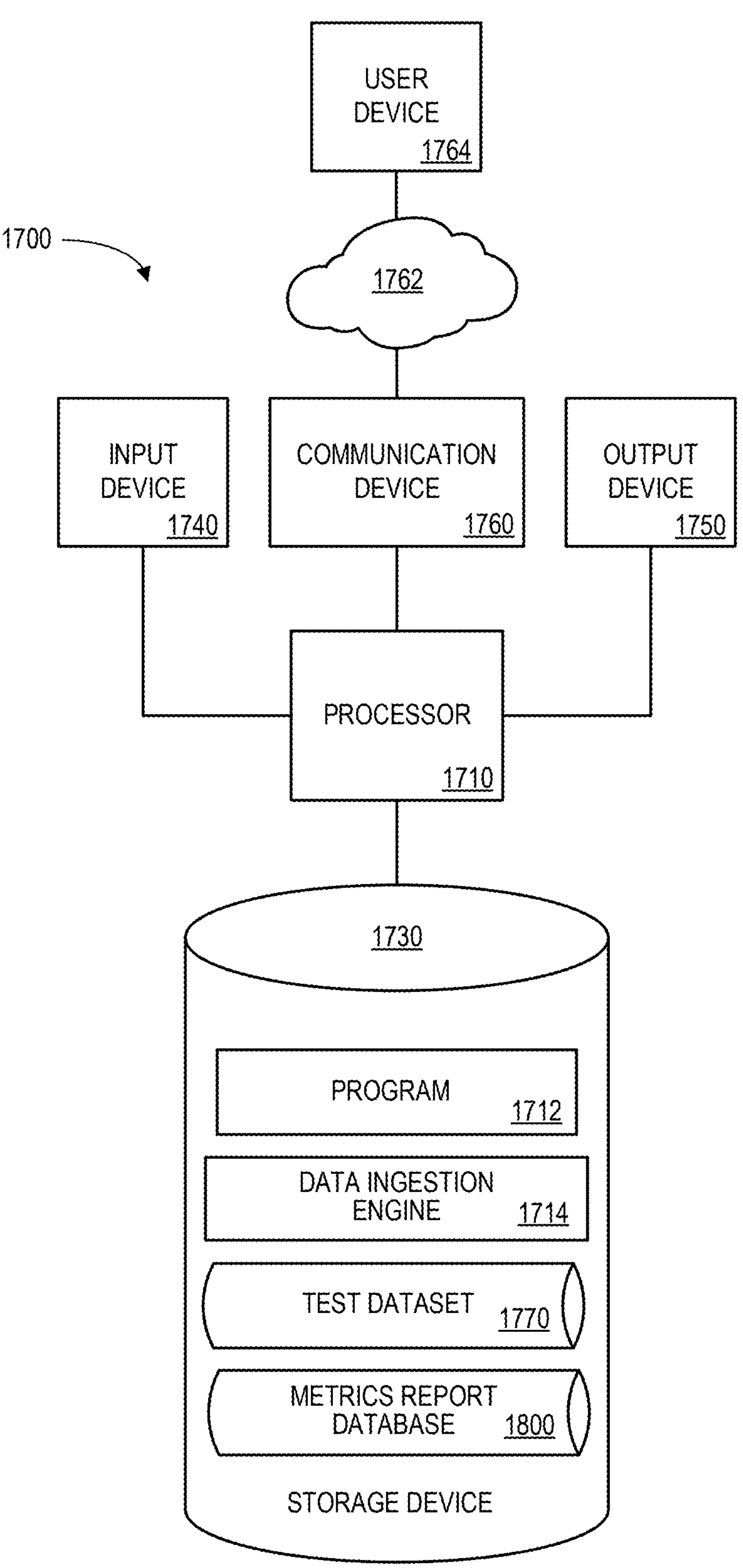
FIG. 17 is an apparatus or platform according to some embodiments.

Embodiments described herein may be implemented using any number of different hardware configurations. For example, FIG. 17 is a block diagram of an apparatus or platform 1700 that may be, for example, associated with the system 400 of FIG. 4 (and/or any other system described herein). The platform 1700 comprises a processor 1710, such as one or more commercially available Central Processing Units ("CPUs") in the form of one-chip microprocessors, coupled to a communication device 1760 configured to communicate via one or more communication networks. The communication device 1760 may be used to communicate, for example, with one or more user devices 1764 via a distributed computer network 1762. The platform 1700 further includes an input device 1740 (e.g., a computer mouse and/or keyboard to input data source information, chunking rules and logic, etc.) and/an output device 1750 (e.g., a computer monitor to render a display, transmit recommendations, charts, alerts, reports about RAG results, etc.).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or data ingestion engine 1714 for controlling the processor 1710. The processor 1710 performs instructions of the programs 1712, 1714, and thereby operates in accordance with any of the embodiments described herein. For example, the processor 1710 may iteratively perform the following process until an evaluation threshold is satisfied: determine an RAG generation metric score, determine an RAG retrieval metric score, determine an end-to-end RAG metric score, and automatically adjust at least one RAG turning parameter. When the evaluation threshold is satisfied at 1710, the system may output a metrics report including the RAG generation metrics scores, the RAG retrieval metrics scores, and end-to-end RAG metrics scores.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores the test dataset 1770 and a metrics report database 1800. An example of a database that may be used in connection with the platform 1700 will now be described in detail with respect to FIG. 18. Note that the database described herein is only one example, and additional and/or different information may be stored therein. Moreover, various databases might be split or combined in accordance with any of the embodiments described herein.

Referring to FIG. 18, a table is shown that represents the metrics report database 1800 that may be stored at the platform 1700 according to some embodiments. The table may include, for example, entries representing evaluations that have been performed. The table may also define fields 1802, 1804, 1806, 1808, 1810 for each of the entries. The fields 1802, 1804, 1806, 1808, 1810 may, according to some embodiments, specify: a metrics report identifier 1802, an enterprise RAG system identifier 1804, generation metrics 1806, retrieval metrics 1808, and end-to-end metrics 1810. The metrics report database 1800 may be created and updated, for example, when new user queries are received, an enterprise RAG system is added, fine tune adjustments are made, etc.

The metrics report identifier 1802 might be a unique alphanumeric label for a report that provides an evaluation of an enterprise RAG system associated with the enterprise RAG system. The generation metrics 1806 might include, for example, faithfulness and answer relevance scores. The retrieval metrics 1808 might include, for example, context precision, context relevancy, and context recall scores. The end-to-end metrics 1810 might include, for example, answer semantic similarity and answer correctness scores.

Note that an RAG system in an AI toolkit might support Q&A but provide poor quality answers. In order to improve system quality, a framework to identify potential issues is provided and after improvements are made the system can be used to make sure there isn't any regression to other use cases. Embodiments described herein define several metrics for an RAG system (e.g., context precision, context recall, faithfulness, answer correctness, etc.) to measure system quality. Test data may be collected from different use cases and the Ragas open source may be used to generate a synthetic test dataset (and get the questions and answers reviewed by a human). An enterprise RAG evaluation framework may load the test document into a RAG system with noise data to mimic the real environment. The enterprise RAG evaluation framework will query the RAG system to generate the answer for each question in the dataset. The enterprise RAG evaluation framework will also use the embedding and LLM to score each answer for each metrics. A full report, comparing various iterations, may be automatically generated and provide suggestions (e.g., created with an LLM).

In this way, embodiments may help provide improved usability by enabling more accurate and efficient retrieval of enterprise data. Users can expect more relevant and comprehensive results, which can substantially improve their experience and productivity. Furthermore, embodiments may provide substantial flexibility because it can be adapted to different types of enterprise data and queries.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of use cases, any of the embodiments described herein could be applied to other types of use cases.

Figure 19:
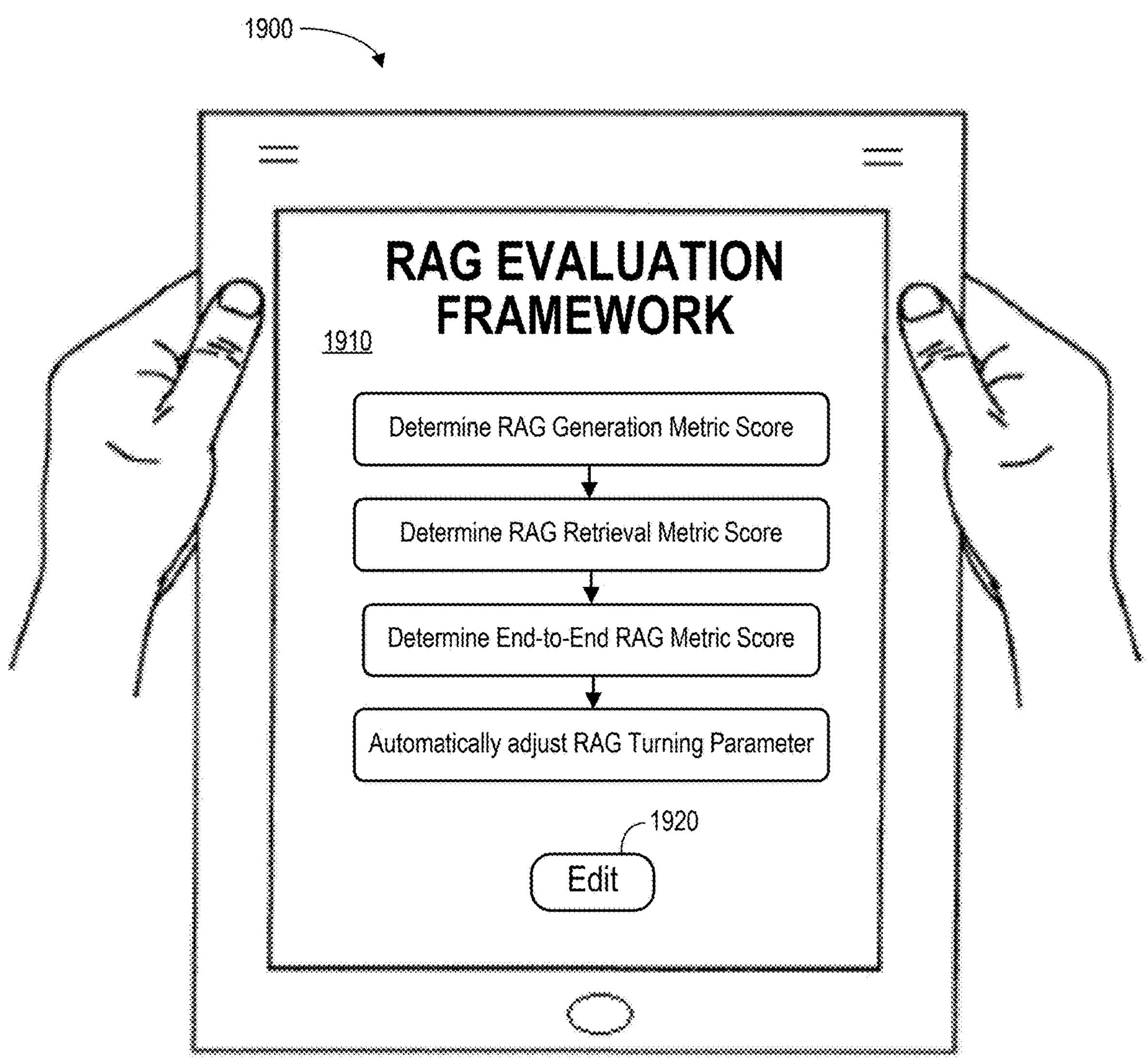
FIG. 19 illustrates a tablet computer RAG evaluation framework display according to some embodiments.

In addition, the displays shown herein are provided only as examples, and any other type of user interface could be implemented. For example, FIG. 19 illustrates a tablet computer 1900 providing a RAG evaluation framework display 1910 according to some embodiments. The display 1910 might be used, for example, to control the processing of user queries being implemented by an enterprise. A user may interact with the display 1910, such as via an "Edit" icon 1920 (e.g., to change metric equations, adjust RAG turning parameter rules or logic, etc.).

Figure 20:
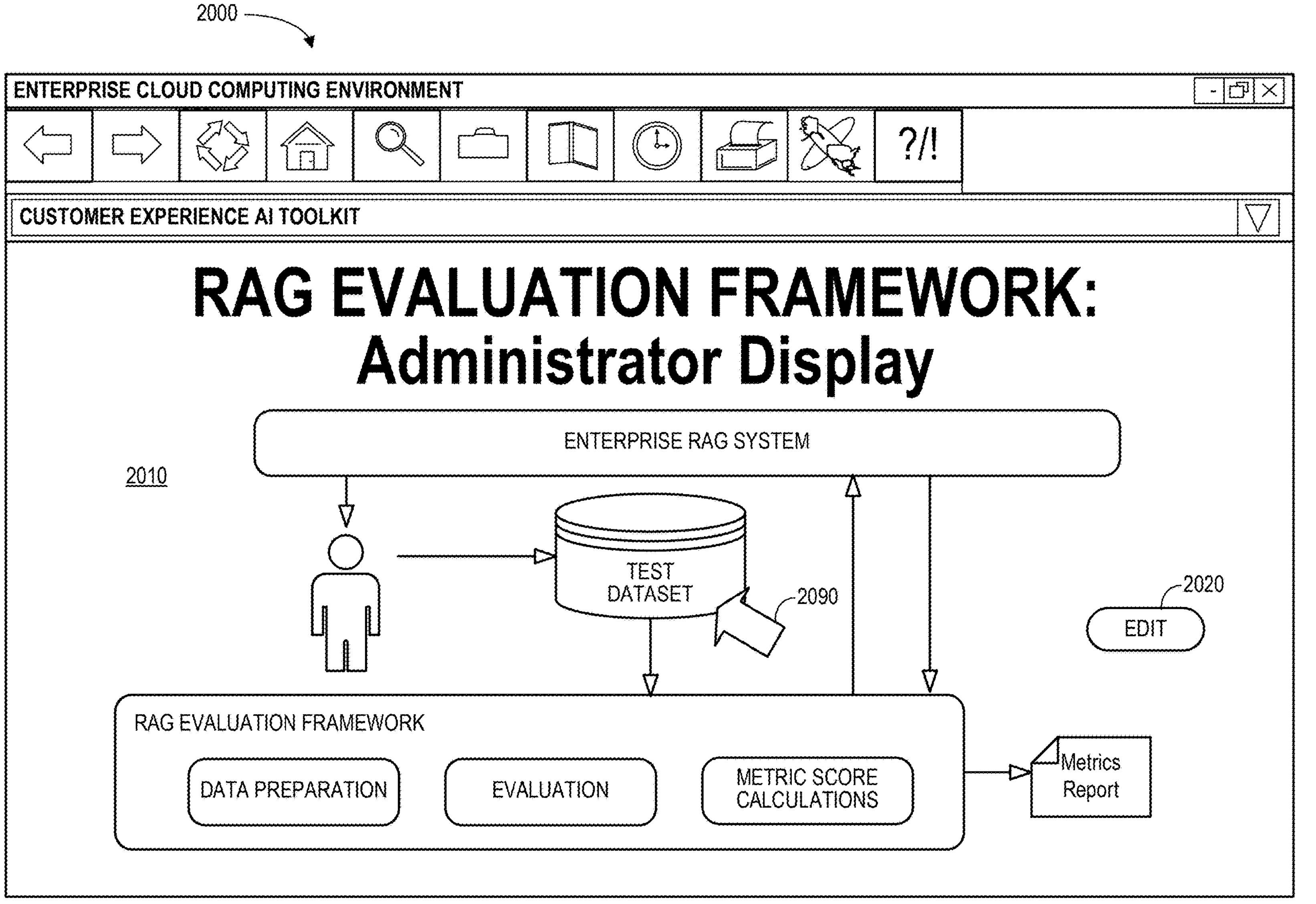
FIG. 20 is an operator or administrator enterprise RAG evaluation framework display in accordance with some embodiments.

FIG. 20 is an enterprise RAG evaluation framework display 2000 in accordance with some embodiments. The display 2000 includes a graphical representation 2010 of an AI toolkit in accordance with any of the embodiments described herein. Selection of an element on the display 2000 (e.g., via a touchscreen or computer pointer 2090) may result in display of a pop-up window containing more detailed information about that element and/or various options (e.g., to define how a data source interacts with the toolkit, how users communicate with the toolkit, etc.). Selection of an "Edit" icon 2020 may also let an operator or administrator adjust the operation of the system (e.g., to change a mapping to a data store, tune chunk size parameters, make changes to embedding models or internal LLMs, and new RAG systems, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system, comprising:

an enterprise Retrieval-Augmented Generation ("RAG") system associated with at least one Large Language Model ("LLM");

a test dataset including questions, context information, and ground truth answers; and an enterprise RAG evaluation framework, coupled to the test dataset and the enterprise RAG system, including:

a computer processor, and a computer memory storing instructions that, when executed by the computer processor, cause the enterprise RAG evaluation framework to:

iteratively perform the following process until an evaluation threshold is satisfied:

determine an RAG generation metric score, determine an RAG retrieval metric score, determine an end-to-end RAG metric score, and automatically adjust at least one RAG turning parameter, and when the evaluation threshold is satisfied, output a metrics report including the RAG generation metrics scores, the RAG retrieval metrics scores, and end-to-end RAG metrics scores.

2. The system of claim 1, wherein the evaluation threshold is associated with at least one of: (i) a number of iterations, and (ii) a level of enterprise RAG performance.

3. The system of claim 1, wherein the RAG tuning parameter is associated with at least one of: (i) a document loader parameter, (ii) a splitter parameter, (iii) a threshold value, (iv) an embedding model, (v) a chunk size, and (vi) a chunk overlap parameter.

4. The system of claim 1, wherein the enterprise RAG evaluation framework is further to perform at least one of the following: (i) clean up noise in the test dataset, and (ii) add more signals to the test dataset.

5. The system of claim 1, wherein the RAG generation metrics scores include at least one of: (i) a faithfulness score measuring how factually consistent a generated answer is with the context information, and (ii) an answer relevance score measuring how correctly the generated answer addresses the question.

6. The system of claim 1, wherein the RAG retrieval metrics scores include at least one of: (i) a context precision score measuring if all relevant items from the context information are retrieved, (ii) a context relevancy score measuring a relevancy of the retrieved context information to the question, and (iii) a context recall score measuring how well the retrieved context information matches a generated answer.

7. The system of claim 1, wherein the end-to-end RAG metrics scores include at least one of: (i) an answer semantic similarity score measuring how closely semantic content of the generated answer aligns with the associated ground truth, and (ii) an answer correctness score measuring a factual overlap between the generated answer and the ground truth answer.

8. The system of claim 1, wherein information in the test dataset is associated with at least one of: (i) information generated by a human, and (ii) synthetically generated information.

9. The system of claim 1, wherein the metrics report is provided to an automated agent that generates an enterprise RAG system adjustment.

10. The system of claim 1, wherein the enterprise RAG system is associated with an Artificial Intelligence ("AI") toolkit.

11. The system of claim 1, wherein the enterprise RAG evaluation framework is associated with a monitoring pipeline for a production enterprise RAG system and at least one alternate LLM.

12. The system of claim 1, wherein the enterprise evaluation framework includes:

documents associated with an enterprise, each document containing a document identifier; and a Retrieval-Augmented Generation ("RAG") data ingestion platform, coupled to the documents, that:

retrieves a document and associated document identifier, divides the retrieved document into a first set of chunks, outputs a first LLM query, designed to predict questions associated with the retrieved document based on the first set of chunks, to a first LLM, executes a first embedding model on a response to the first LLM query and document metadata including the document identifier, stores a result of the first embedding model in a RAG vector database, divides the retrieved document into a second set of chunks, chunks in the second set being smaller than chunks in the first set of chunks and including a second chunk identifier, executes a second embedding model based on the second set of chunks including the second chunk identifier, and stores a result of the second embedding model in the RAG vector database.

13. A computer-implemented method, comprising:

iteratively performing the following process, by a computer processor of an enterprise Retrieval-Augmented Generation ("RAG") evaluation system coupled to an enterprise RAG system associated with at least one Large Language Model ("LLM"), until an evaluation threshold is satisfied:

determining RAG generation metric scores including: (i) a faithfulness score measuring how factually consistent a generated answer is with the context information, and (ii) an answer relevance score measuring how correctly the generated answer addresses the question, determining RAG retrieval metric scores including (i) a context precision score measuring if all relevant items from the context information are retrieved, (ii) a context relevancy score measuring a relevancy of the retrieved context information to the question, and (iii) a context recall score measuring how well the retrieved context information matches the generated answer, determining end-to-end RAG metric scores including: (i) an answer semantic similarity score measuring how closely semantic content of the generated answer aligns with the associated ground truth, and (ii) an answer correctness score measuring a factual overlap between the generated answer and the ground truth answer, and automatically adjusting at least one RAG turning parameter; and when the evaluation threshold is satisfied, outputting a metrics report that includes the RAG generation metrics scores, the RAG retrieval metrics scores, and end-to-end RAG metrics scores.

14. The method of claim 13, wherein the evaluation threshold is associated with at least one of: (i) a number of iterations, and (ii) a level of enterprise RAG performance.

15. The method of claim 13, wherein the RAG tuning parameter is associated with at least one of: (i) a document loader parameter, (ii) a splitter parameter, (iii) a threshold value, (iv) an embedding model, (v) a chunk size, and (vi) a chunk overlap parameter.

16. The method of claim 13, wherein the enterprise RAG evaluation framework is further to perform at least one of the following: (i) clean up noise in the test dataset, and (ii) add more signals to the test dataset.

17. The method of claim 13, wherein the RAG tuning parameter is associated with at least one of: (i) a document loader parameter, (ii) a splitter parameter, (iii) a threshold value, (iv) an embedding model, (v) a chunk size, and (vi) a chunk overlap parameter.

18. One or more non-transitory computer-readable media storing computer-executable instructions that, when executed by a computing system, cause the computing system to perform operations, comprising:

iteratively performing, by a computer processor of an enterprise Retrieval-Augmented Generation ("RAG") evaluation system coupled to an enterprise RAG system associated with at least one Large Language Model ("LLM"), the following process until an evaluation threshold is satisfied:

determining an RAG generation metric score, determining an RAG retrieval metric score, determining an end-to-end RAG metric score, and automatically adjusting at least one RAG turning parameter; and when the evaluation threshold is satisfied, outputting a metrics report that includes the RAG generation metrics scores, the RAG retrieval metrics scores, and end-to-end RAG metrics scores.

19. The media of claim 18, wherein the RAG generation metrics scores include at least one of: (i) a faithfulness score measuring how factually consistent a generated answer is with the context information, and (ii) an answer relevance score measuring how correctly the generated answer addresses the question.

20. The media of claim 18, wherein the RAG retrieval metrics scores include at least one of: (i) a context precision score measuring if all relevant items from the context information are retrieved, (ii) a context relevancy score measuring a relevancy of the retrieved context information to the question, and (iii) a context recall score measuring how well the retrieved context information matches a generated answer.

21. The media of claim 18, wherein the end-to-end RAG metrics scores include at least one of: (i) an answer semantic similarity score measuring how closely semantic content of the generated answer aligns with the associated ground truth, and (ii) an answer correctness score measuring a factual overlap between the generated answer and the ground truth answer.

* * * * *